Patented July 24, 1928.

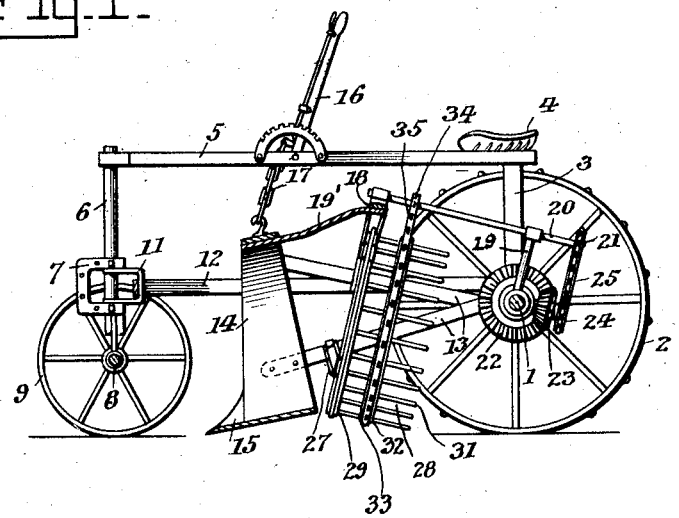
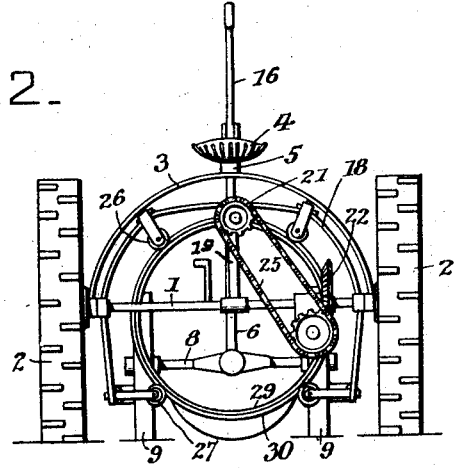

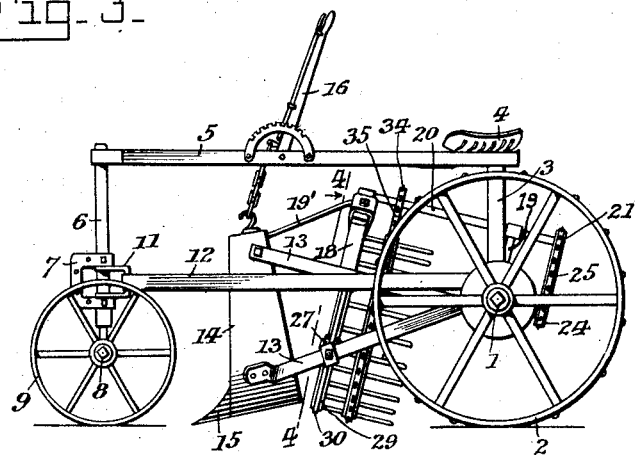

1,678,490

UNITED STATES PATENT OFFICE.

LOU VERD THAYER, OF ADAMSVILLE, PENNSYLVANIA.

POTATO DIGGER.

Application filed November 27, 1926. Serial No. 151,073.

This invention relates to a potato digger and it consists in the novel features hereinafter described and claimed.

An object of the invention is to provide a potato digging machine of simple and durable structure adapted to be drawn by draft animals or a tractor and having its parts and elements so arranged and assembled that the potatoes are elevated over a scoop and deposited into a revolving shaker which separates the soil from the potatoes and deposits the potatoes upon the surface of the soil.

A further object of the invention is to provide new and efficient means for supporting and operating the revolving shaker whereby the parts may be easily and readily adjusted so that the scoop may be lifted above the surface of the soil or lowered to a position at a desired depth below the surface of the soil.

Other objects and advantages will be made manifest as the description of the invention progresses.

In the accompanying drawings:—

Figure 1 is a longitudinal sectional view of the potato digger.

Figure 2 is a rear elevational view of the same.

Figure 3 is a side elevational view of the same, and

Figure 4 is a fragmentary sectional view of the potato digger cut on the line 4—4 of Figure 3.

As illustrated in the accompanying drawings the potato digger comprises an axle 1 mounted upon ground engaging wheels 2. An arch member 3 is mounted upon the axle 1 and a seat 4 is carried at the upper intermediate portion of the said arch member. A beam 5 is mounted at its rear end upon the arch member 3 and a shaft 6 is journaled in the forward portion of the beam. The shaft 6 is vertically disposed and carries at its intermediate portion a clevis 7. An axle 8 is connected with the lower end of the shaft 6 and truck wheels 9 are journaled upon the ends of the axle 8. A yoke 11 is carried at the intermediate portions of the shaft 6. A frame 12 is mounted at its rear end upon the axle 1 and is connected at its forward end with the yoke 11.

Arms 13 are pivotally connected at their rear end with the axle 1 and the said arms are connected at their forward ends with a scoop member 14. The scoop member 14 is preferably circular in form and is provided at its forward edge and at its lower side with a lip 15. A lever 16 is pivoted upon the intermediate portion of the beam 5 and a chain 17 is connected at one end with the lever 16 and at its other end with the scoop member 14. It is apparent that by swinging the lever 16 the scoop member 14 may be raised or lowered. A substantially arcuate guide member 18 is connected with the upper portion of the scoop member 14 by means of an arm 19. Said guide member is attached at its ends to the upper arms 13 as best shown in Figure 4 of the drawings.

An arm 19 is pivotally mounted upon the intermediate portion of the axle 1 and a shaft 20 is journaled in the upper portion of the arm 19. The forward end of the shaft 20 is journaled on the arcuate member 18. A sprocket wheel 21 is fixed to the rear end of the shaft 20. A beveled gear wheel 22 is fixed to the axle 1 and its teeth mesh with a beveled pinion 23 which is supported from the said axle. A sprocket wheel 24 is fixed to the shaft of the beveled pinion 23 and a sprocket chain 25 is trained around the sprocket wheels 21 and 24. A block 24' mounted upon the axle 1 supports the shaft of the pinion 23 and the wheel 24. Thus, as the axle 1 rotates rotary movement is transmitted through the beveled gear wheel 22 and pinion 23 to the sprocket wheel 24 which moves the chain 25 in an orbit and the shaft 20 is rotated. Spaced guide rollers 26 are carried by the arch member 18 and guide rollers 27 are carried by the lower arms 13.

A rotating shaker 28 is provided at its forward end with an annular band 29 having an outstanding annular flange 30 which bears against the peripheries of the rollers 26 and 27. The rollers 26 and 27 are grooved to receive the flange 30 whereby the band 29 is held against lateral movement with relation to the rollers. The rotating shaker also includes spaced teeth 31 which are attached at their forward end to the band 29. A band 32 surrounds the intermediate portion of the group of teeth 31 and is provided with outstanding sprocket teeth 33. A sprocket wheel 34 is mounted upon the intermediate portion of the shaft 20 and a sprocket chain 35 is trained around the sprocket wheel 34 and the band 32 and is adapted to engage the teeth 33 of the said band.

The rotating shaker 28 is downwardly and rearwardly inclined and its lower forward edge is located just behind the scoop member 14. The scoop member 14 is downwardly inclined toward the rotating shaker.

Therefore, as the machine is drawn along a row of potatoes and when the scoop member 14 is lowered the lip passes under the potatoes in the soil and the potatoes are lifted and deposited into the shaker 28. When the shaker 28 is rotated by the chain 35 the dirt is separated from the potatoes and passes through the spaces betwen the teeth 31 and falls to the ground. The potatoes roll to the rear end of the teeth 31 and fall to the ground and are deposited upon the upper surface of the soil and may be subsequently gathered in any suitable manner. By lifting the lever 16 the lip 15 may be positioned at any desired step below the surface of the soil and the lever 16 may be moved so as to lift the lip 15 of the scoop completely above the surface of the soil.

The relative rate of speed at which the rotating shaker 28 revolves with relation to the speed of travel of the machine may be regulated by varying the relative proportion of the sprocket wheels 21 and 24 by removing the sprocket wheels and substituting wheels of different diameters upon their respective shaft supports.

From the foregoing description taken in conjunction with the accompanying specification it will be seen that a potato digger of simple and durable structure is provided and that the same may be easily and conveniently adjusted to lift the potatoes above the surface of the soil, separate the soil from the potatoes and deposit the cleaned potatoes upon the surface of the soil.

From the foregoing description of the construction of my improved device, it will be seen that I have provided a simple, inexpensive and efficient means for carrying out the objects of the invention.

While I have particularly described the elements best adapted to perform the functions set forth, it is obvious that various changes in form, proportion and in the minor details of construction may be resorted to without departing from the spirit or sacrificing any of the principles of the invention.

Having described the invention, what is claimed is:

A potato digger comprising a frame mounted upon front and rear wheel supported axles, arms pivoted to the rear axle, lower guide rollers carried by certain of the arms, a scoop connected with the arms, means mounted upon the frame for raising and lowering the scoop, a shaft supported transversely above the rear axle and disposed longitudinally of the frame, means for rotating the shaft from the rear axle, an arcuate guide member supported upon the arms and having a bearing receiving said shaft, upper guide rollers carried by the guide member, a rotating shaker mounted between the lower and upper guide rollers and means for operating the shaker from the shaft.

In testimony whereof I affix my signature.

LOU V. THAYER.